No. 641,632. Patented Jan. 16, 1900.
H. C. ARNOLD.
WIRE SPLICING TOOL.
(Application filed May 4, 1899.)
(No Model.) 2 Sheets—Sheet 2.
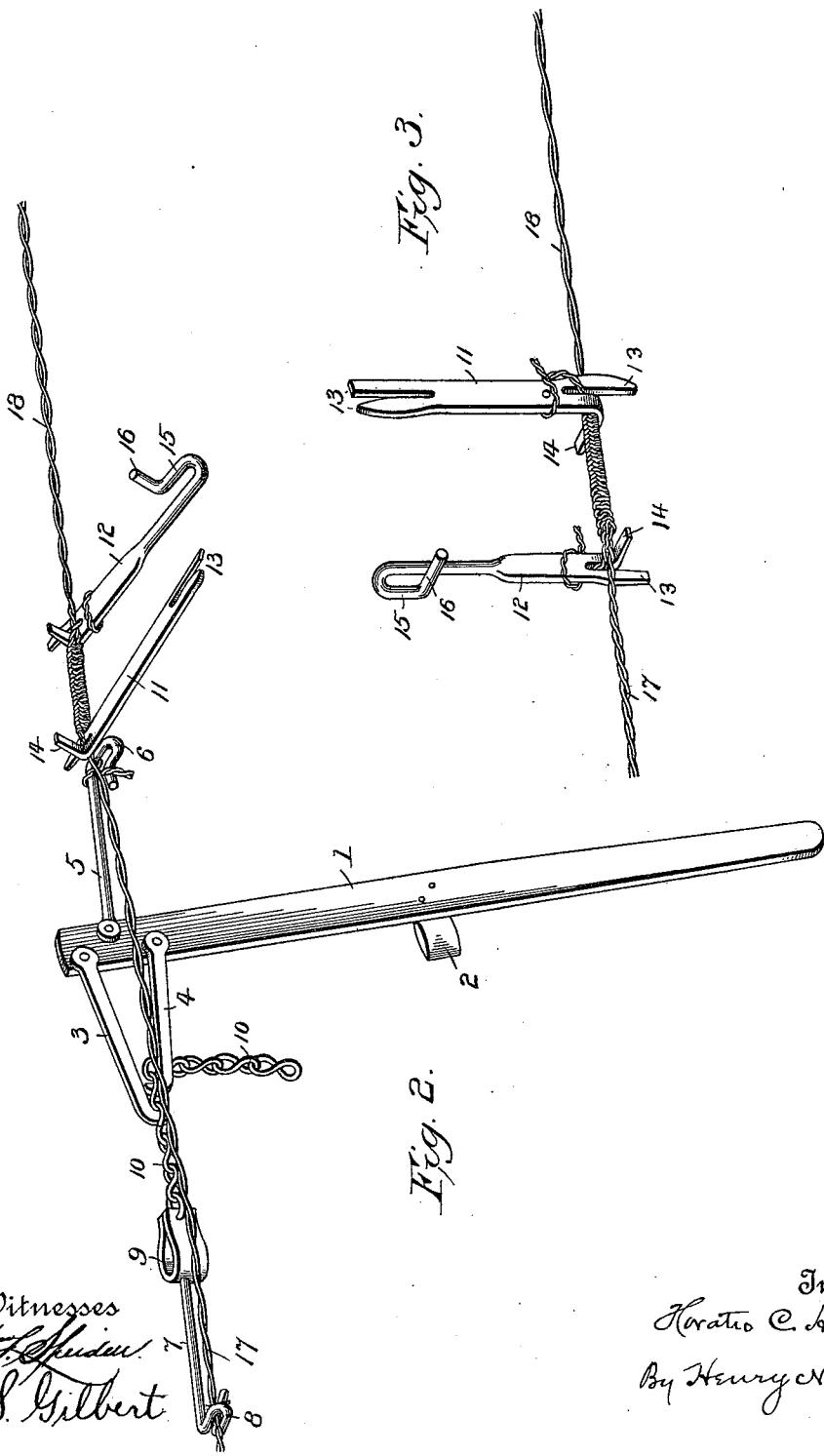
Witnesses
W. J. Sheridan
A. S. Gilbert
Inventor
Horatio C. Arnold
By Henry N. Copp,
Attorney
THE NORRIS PETERS CO., PHOTO-LITHO., WASHINGTON, D. C.

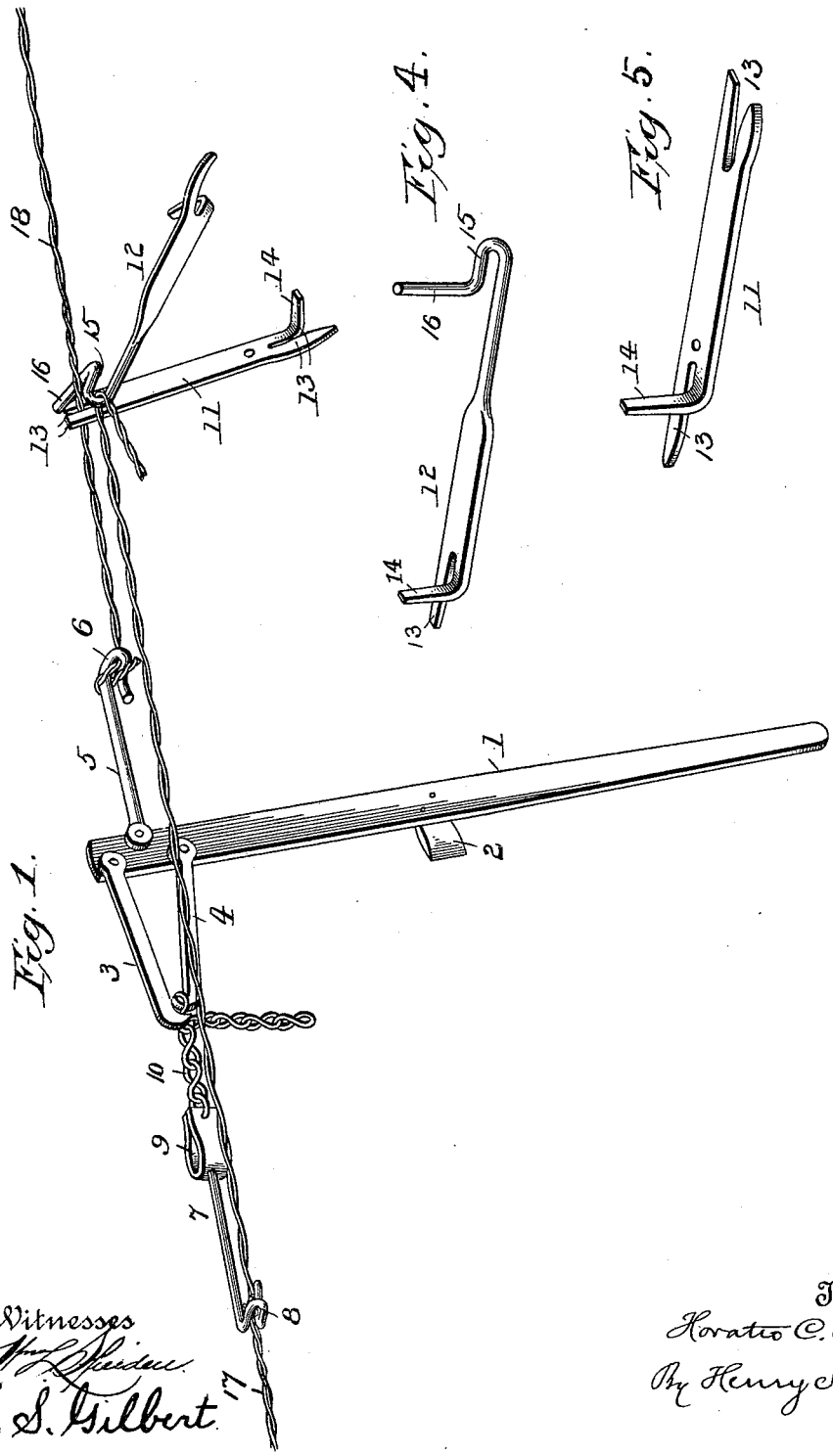

UNITED STATES PATENT OFFICE.

HORATIO CONSTANTINE ARNOLD, OF LAS ANIMAS, COLORADO.

WIRE-SPLICING TOOL.

SPECIFICATION forming part of Letters Patent No. 641,632, dated January 16, 1900.

Application filed May 4, 1899. Serial No. 715,565. (No model.)

*To all whom it may concern:*

Be it known that I, HORATIO CONSTANTINE ARNOLD, a citizen of the United States, residing at Las Animas, in the county of Bent and State of Colorado, have invented certain new and useful Improvements in Wire-Splicers; and I do hereby declare the following to be a full, clear, and exact description of the invention, such as will enable others skilled in the art to which it appertains to make and use the same.

This invention relates to tools for repairing wire fences.

My object is to provide a wire-splicing tool of improved construction which will be adapted for repairing the broken runners of the fence rapidly and easily.

The invention resides in certain novel features of construction and combinations of parts, as will clearly appear from the following description and appended claim.

In the accompanying drawings, Figure 1 is a view showing the stretcher in use and the position of the splicers during the first operation; Fig. 2, a view showing the second operation of the splicers; Fig. 3, a view showing the final operation of the same, and Figs. 4 and 5 are details of the splicers.

The operating-lever 1 of the stretcher is provided with the wire-cutter 2, which is used for cutting the ends of the wire after the splice has been completed.

The numerals 3 and 4 designate duplicate dogs or pawls pivoted at one end to the lever and provided with hooks at their free ends. A wire-clamp 5 has one end pivoted to the lever at a point intermediate the pivoted points of the dogs, said clamp being provided with the hook 6 at its free end for engaging the wire.

The numeral 7 designates the remaining wire-clamp, the same having a hook 8, similar to hook 6 and being provided with a swivel-head 9, to which is connected a chain 10, with which the hooked ends of the dogs are adapted to engage.

There are two splicing-tools, one of which, 11, I shall designate the "holding-tool," and the other, 12, the "wrapping-tool." The holding-tool 11 has two fingers 13 at one end, provided by notching it, and the other end is of similar construction with the exception that one of the fingers is bent at right angles to its length at 14. Aside from this difference the fingers are quite long and the space between them comparatively wide. One end of the wrapping-tool 12 is constructed similarly to the end having the finger 14, and the other end is bent into the portion 15, lying parallel to the shank and terminated in the portion 16, disposed at right angles thereto.

When splicing the broken ends of a fence-runner, the hook 8 is engaged with a barb on one end 17 of the wire, and the other end 18 is passed through the hook 6 and wrapped around the shank of the clamp to prevent slipping. One of the dogs or pawls is then engaged with a link of the chain after stretching and the lever rocked and the other dog engaged with said chain. This alternation of engagement is continued until the wire is properly stretched. The end 17 is then passed through the hook on the wrapping-tool and bent back again (see Fig. 1) and the notched end of the holding-tool fitted over the end 18. The wrapping-tool being grasped by the right hand and the holding-tool by the left hand, the wrapping-tool is turned under and up over the wire a few times, which causes the end 17 to wrap on end 18. The two tools are now removed and their ends reversed and the wire 17 made to enter the crotch in the end of the said tool, while the straight finger on the holding-tool is inserted between the two wire ends. (See Fig. 2.) While the holding-tool is held stationary, the wrapping-tool is rotated, as before, the end of the wire being held from slipping out of the crotch by the finger of the operator as the wrapping-tool is rotated, both ends of the wire will be twisted, the finger on the holding-tool sliding along between the wires in response to the pressure. When the wire has been stretched sufficiently, the wire-stretcher is removed and the splicing-tools are applied, as shown in Fig. 3. The wrapping-tool is held stationary while the holding-tool is turned, whereupon a further wrapping will be obtained and the splice completed. The free ends of the splice are held against the cutter on the lever and struck by a hammer to cut them off and give the splice a finished appearance.

Having thus described my invention, what I claim as new, and desire to secure by Letters Patent, is—

A wrapping-tool for splicing wire, consisting of a shank having one end bent parallel to the shank and then bent at right angles to itself and its other end provided with separated fingers, one of which is bent at right angles to its length.

In testimony whereof I affix my signature in presence of two witnesses.

HORATIO CONSTANTINE ARNOLD.

Witnesses:
LEWIS P. WHITTINGHILL.
JACOB WEIL.